(12) United States Patent
Claussen et al.

(10) Patent No.: US 8,265,701 B2
(45) Date of Patent: Sep. 11, 2012

(54) PICOCELL BASE STATION FOR WIRELESS TELECOMMUNICATIONS PROVIDING RADIO COVERAGE LOBES, AND A METHOD OF IDENTIFYING WHICH SUBSET OF THE LOBES COVERS A USER TERMINAL

(75) Inventors: Holger Claussen, Swindon (GB); Lester Tse Wee Ho, Swindon (GB)

(73) Assignee: Alcatel Lucent, Paris (FR)

( * ) Notice: Subject to any disclaimer, the term of this patent is extended or adjusted under 35 U.S.C. 154(b) by 387 days.

(21) Appl. No.: 12/419,391

(22) Filed: Apr. 7, 2009

(65) Prior Publication Data

US 2009/0258680 A1  Oct. 15, 2009

(30) Foreign Application Priority Data

Apr. 14, 2008 (EP) .................................. 08007296

(51) Int. Cl.
*H04M 1/00* (2006.01)

(52) U.S. Cl. .................... 455/562.1; 455/67.11; 370/334

(58) Field of Classification Search ............... 455/562.1, 455/67.11, 444, 423; 370/334, 339, 332, 370/328, 335, 338
See application file for complete search history.

(56) References Cited

U.S. PATENT DOCUMENTS

| 6,526,271 | B1 | 2/2003 | Uesugi et al. |
| 6,694,154 | B1 * | 2/2004 | Molnar et al. ............. 455/562.1 |
| 7,953,065 | B2 * | 5/2011 | Lysejko et al. ................ 370/350 |
| 2003/0073463 | A1 * | 4/2003 | Shapira ......................... 455/562 |
| 2007/0225000 | A1 | 9/2007 | Cleveland |

FOREIGN PATENT DOCUMENTS

| JP | 9200115(A) | 7/1997 |
| JP | H11-252045 | 9/1999 |
| JP | 2001352287 (A) | 12/2001 |
| JP | 2002171553 (A) | 6/2002 |
| WO | WO 2004/114460 A2 | 12/2004 |

* cited by examiner

Primary Examiner — Dwayne Bost
Assistant Examiner — Kenneth Corbin
(74) *Attorney, Agent, or Firm* — Fay Sharpe LLP

(57) ABSTRACT

A method is provided in a base station having multiple directional antenna elements each providing a corresponding radio coverage lobe to identify which subset of the lobes covers a user terminal. The base station is a picocell base station. A user terminal is positioned within the coverage area of the base station. A subset of the lobes is selected. The base station applies for a period an adjusted signal power in respect of the selected subset of the lobes. The signal power is detected and information dependent upon the detected pilot signal power is provided. The base station uses said information to determine whether or not the user terminal is located in the selected subset of lobes. A sub-group of the subset of lobes is then selected and a corresponding determination is made whether or not the user terminal is located in the selected sub-group.

16 Claims, 9 Drawing Sheets

(PROR ART)

PICOCELL BASE STATION FOR WIRELESS TELECOMMUNICATIONS PROVIDING RADIO COVERAGE LOBES, AND A METHOD OF IDENTIFYING WHICH SUBSET OF THE LOBES COVERS A USER TERMINAL

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, picocells, or femtocells, but we use the term picocells generically for cells that are smaller than macrocells. One way to establish a picocell is to provide a picocell base station that operates within a relatively limited range within the coverage area of a macrocell. One example of use of a picocell base station is to provide wireless communication coverage within a building.

The picocell base station is of a relatively low transmit power and hence each picocell is small compared to a macrocell.

Picocell base stations can use broadband Internet Protocol connections as "backhaul", in other words they are connected via picocell base station gateways to a Universal Mobile Telecommunications System (UMTS) core network, specifically each gateway is connected via the operator's Internet Protocol (IP) network to core network components such as to a UMTS Mobile Switching Centre (MSC) and a Signalling Gateway Support Node (SGSN).

Picocell base stations are intended primarily for users belonging to a particular home or office. Picocell base stations may be private access or public access. In private access picocell base stations, access is restricted only to registered users, for example family members or particular groups of employees. In public access picocell base stations, other users may also use the picocell base station, subject to certain restrictions to protect the Quality of Service received by registered users.

There can be a large number of picocells within an area roughly equivalent to the size of a macrocell. Accordingly, there can be a large number of picocells in an operator's coverage area, such that conventional cell planning, as done to optimise location of base stations in macrocell networks, becomes impractical. This is particularly so as picocells are usually deployed by end-users or unskilled individuals installing picocell base stations where they choose in their offices and homes, for example in what is sometimes called a "plug-and-play" manner.

Where picocells are deployed, there is an increase in the number of cells that a mobile user terminal detects and interacts with. For example, a macrocell user moving along a road may often move in and out of range of picocell base stations, causing a sequence of handover attempt processes to and from the picocells. This disadvantageously produces an increase in the core network signalling and an increase in the risk that a call will be dropped due to the higher number of handover attempts. This can be to the detriment of data handling performance of the picocells. As the number of picocell base stations increases within a network, more network resources are required to handle handovers to or from picocell base stations. This gives rise to a practical limit on the number of picocell base stations that can be deployed within a macrocell area.

Handover attempts are one type of mobility procedure, and mobility procedures become more frequent in a network including picocells as compared to one with just macrocells. As such mobility procedures were designed for macrocell networks, telecommunications standards can require that multiple network elements are involved, for example, such as MSCs and SGSNs in UMTS core networks to which picocell base stations are connected. Although appropriate in macrocell networks, in a network including picocells, a high number of such resource-intensive mobility procedures between multiple network elements is disadvantageous.

As described in the paper by L. T. W. Ho entitled "Effects of User-Deployed, Co-Channel Femtocells on the Call Drop Probability in a Residential Scenario", The $18^{th}$ Annual IEEE International Symposium on Personal, Indoor and Radio Communications (PIMRC'07), 2007, if a picocell base station provides coverage in public spaces, there is a large increase in mobility procedures such as handover attempts and idle mode mobility. In addition to a significant increase in core network signalling, an unacceptably large increase in call drop probability may result.

Accordingly, it is important to seek to optimise the radio coverage from picocell base stations, such that the building in which the picocell base station is located is largely or fully covered, but, on the other hand, little coverage extends outside, for example to where unregistered users may pass by the building.

As shown in FIG. 1 (PRIOR ART), ignoring effects due to reflection and attenuation by walls, a known picocell base station 14 having a single antenna (not shown), namely a dipole, has a radiation pattern (i.e. radio coverage area) that is essentially circular in cross-section. This pattern is disadvantageous when the building 16 is an "awkward" shape, such as being long and thin. For example, a typical English terraced house (e.g. 13.5 metres long by 4.5 metres wide) is such an awkwardly-shaped building 16. There are areas of the building 16 lacking radio coverage whist the radio coverage "spills" into neighbouring houses 18 and onto the street 20.

One known approach to improving this situation is to use multi-antenna arrays in picocell base stations, such that it becomes possible to adjust the gain (i.e. power) and hence the coverage area in selected directions. This improves the ability to provide good coverage within the building, without greater coverage outside the building that would cause an undesirable increase in mobility procedures.

One problem with using multi-element antennas is that, due to cost constraints, conventional receivers in picocell base stations have only one receive signal processing path ("receive chain") of RF receiver, detector and decoder, such that signals from different directions cannot be processed separately. This means the receiver cannot differentiate between signals on the basis of the direction from which they were received. As the receiver lacks the information to decide in what direction(s) gain should be increased or decreased, it is difficult to adapt coverage in a useful way.

One known approach used in some Wireless Local Area Network access points having multiple antennas is to try randomly various predefined antenna gain configurations and select the one that provides the best coverage. This approach can improve the link quality for a current transmission. As it can be considered a "trial and error" approach, it cannot be relied on to quickly provide good coverage within an awkwardly shaped building.

Another known approach used in macrocellular base stations having multiple directional antennas, and corresponding sectors (also known as "cells"), is that each antenna of the array has a separate receive chain. In other words, a separate RF receiver, detector and decoder is provided for each sector. In consequence, the signals from different directions can be differentiated. Using this approach, radio coverage optimisation becomes possible, but there is increased complexity because signals from each sector are processed separately.

International (P.C.T.) patent publication WO2004/114460 provides some background.

SUMMARY OF THE INVENTION

An example of the present invention is a method, in a base station for wireless telecommunications having multiple directional antenna elements each providing a corresponding radio coverage lobe, of identifying which subset of the lobes covers a user terminal. The base station is a picocell base station. The method comprises the following steps. A user terminal is positioned within the coverage area of the base station. A subset of the lobes is selected. The base station applies for a period an adjusted signal power in respect of the selected subset of the lobes. The signal power is detected and information dependent upon the detected signal power is provided. The base station uses said information to determine whether or not the user terminal is located in the selected subset of lobes.

Further steps are undertaken of: selecting a sub-group of the subset of the lobes, the base station for a period applying an adjusted pilot signal power in respect of the selected sub-group, the user terminal detecting received pilot signal power and reporting to the base station information dependent upon the detected signal power, and the base station determining dependent upon said information whether or not the user terminal is located in the selected sub-group.

In another aspect the present invention provides a picocell base station for wireless telecommunications, the picocell base station comprising multiple directional antenna elements each providing a corresponding radio coverage lobe, a detector, a controller, and a receiver, the detector being operative to identify which subset of the lobes covers a user terminal, in which:

the detector comprises a selector operative to select a subset of the lobes, the controller is operative to adjust for a period signal power in respect of the selected subset of the lobes, the receiver is operative to receive information of measured signal power, and the detector uses said information to determine whether or not the user terminal is located in the selected subset of lobes.

The selector is further operative to select a sub-group of the subset of the lobes, the pilot signal generator is further operative to adjust pilot signal power for a period in the selected sub-group, the receiver is operative to receive further information of the measured pilot signal power reported by a user terminal, and the detector uses said further information to determine whether or not the user terminal is located in the selected subgroup of lobes.

Preferably, the picocell base station is operative such that the further steps are repeated with further sub-group(s) of the sub-group of the subset of lobes being considered until the base station determines the lobe in which the user terminal is located.

Preferably, the picocell base station is operative to determine the lobe in which the user terminal is located, and further comprising a coverage optimiser operative to alter the size of said lobe in which the user terminal is located so as to keep the rate of unwanted handover attempts from user terminals in said lobe within predetermined limits.

BRIEF DESCRIPTION OF THE DRAWINGS

Embodiments of the present invention will now be described by way of example and with reference to the drawings, in which.

DETAILED DESCRIPTION

Figure 1:
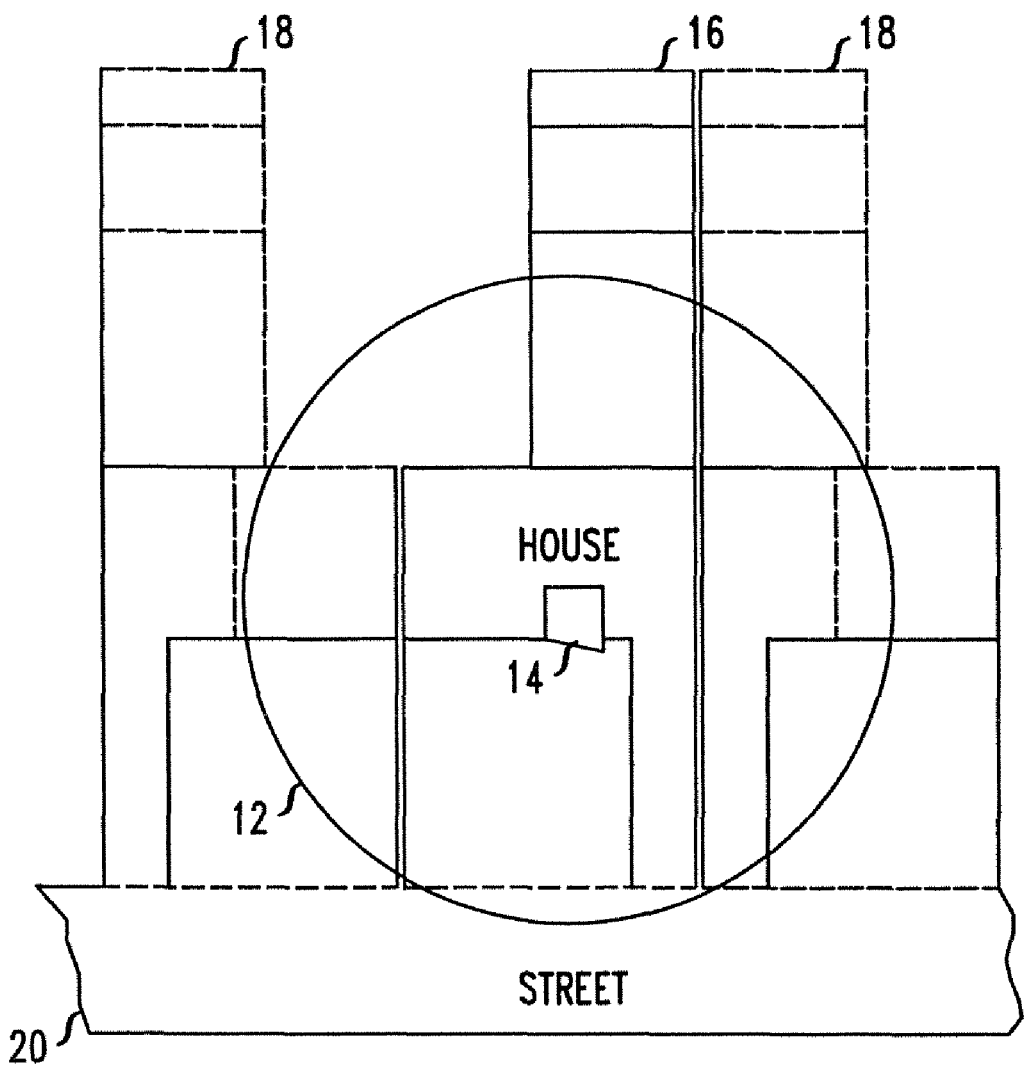
FIG. 1 is a diagram illustrating coverage by a known picocell base station having a single element antenna, wall attenuation and reflection effects not being taken into account (PRIOR ART)
Figure 2:
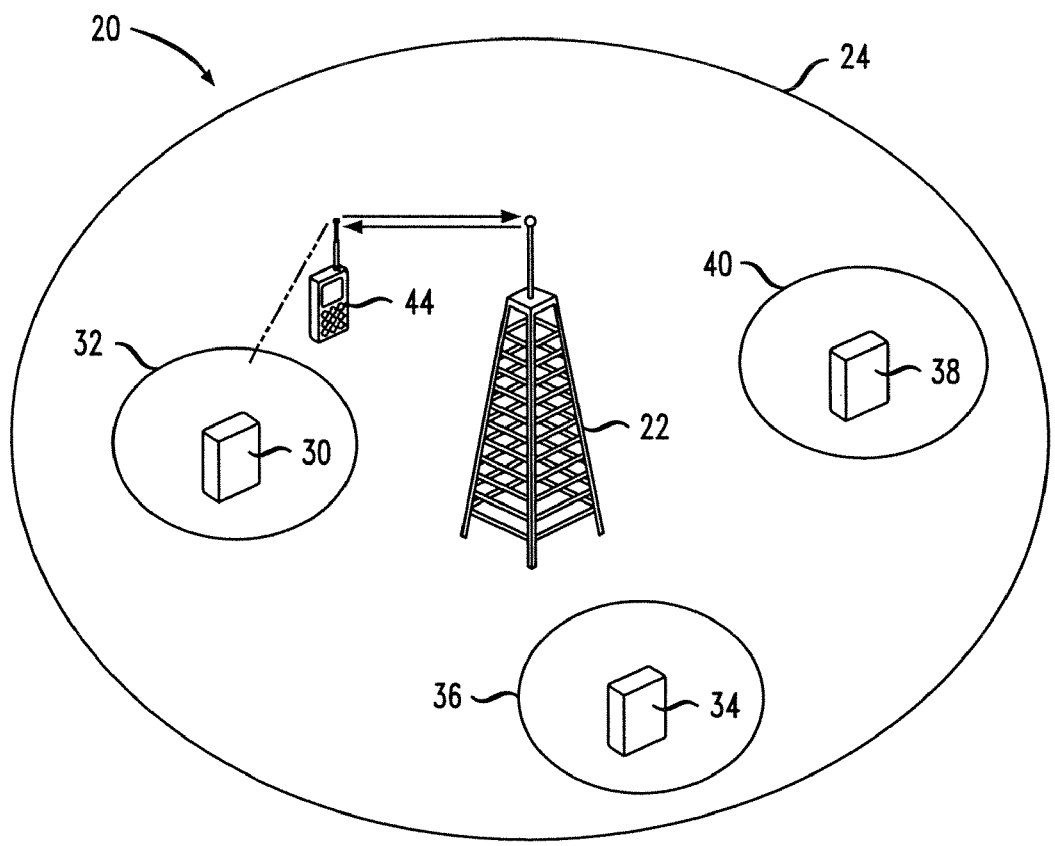
FIG. 2 is a diagram illustrating a wireless communications network according to a first embodiment of the invention.

As shown in FIG. 2, in a communication system 20, there is a base station 22 for wireless telecommunications. The base station has a radio coverage area 24 that is often referred to as a macrocell. The geographic extent of the macrocell 24 depends on the capabilities of the base station 22 and the surrounding geography.

Within the macrocell 24, a picocell base station unit (PCBSU) 30 provides wireless communications within a picocell 32. A picocell is a radio coverage area. In this example, the radio coverage area of the picocell 30 is much less than that of the macrocell 24. For example, the picocell 32 corresponds in size to a user's home.

Another picocell base station unit (PCBSU) 34 provides wireless coverage within a picocell 36. A further picocell 38 provides wireless coverage within a picocell 40.

It is possible for a mobile terminal 44 within the macrocell 24 to communicate with the macrocell base station 22 in known manner. When the mobile terminal 44 enters into a picocell 32 for which the mobile terminal is registered for, in other words has access rights for, communications within the picocell base station 30, it is desirable to handover the connection with the mobile terminal from the macrocell to the picocell. In the example shown in FIG. 2, the user of mobile terminal 44 is a preferred user to use the picocell 32.

Figure 3:
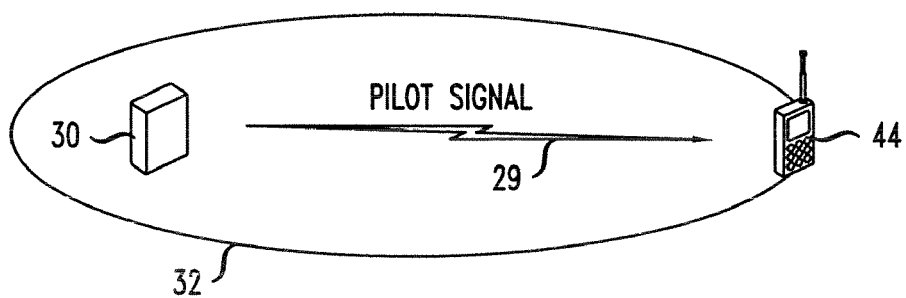
FIG. 3 is a diagram illustrating the picocell associated with a picocell base station unit shown in FIG. 2.

As shown in FIG. 3, the picocell base station unit 30 transmits pilot signals 29 in the picocell 32.

Picocell Base Station Unit (PCBSU)

Figure 4:
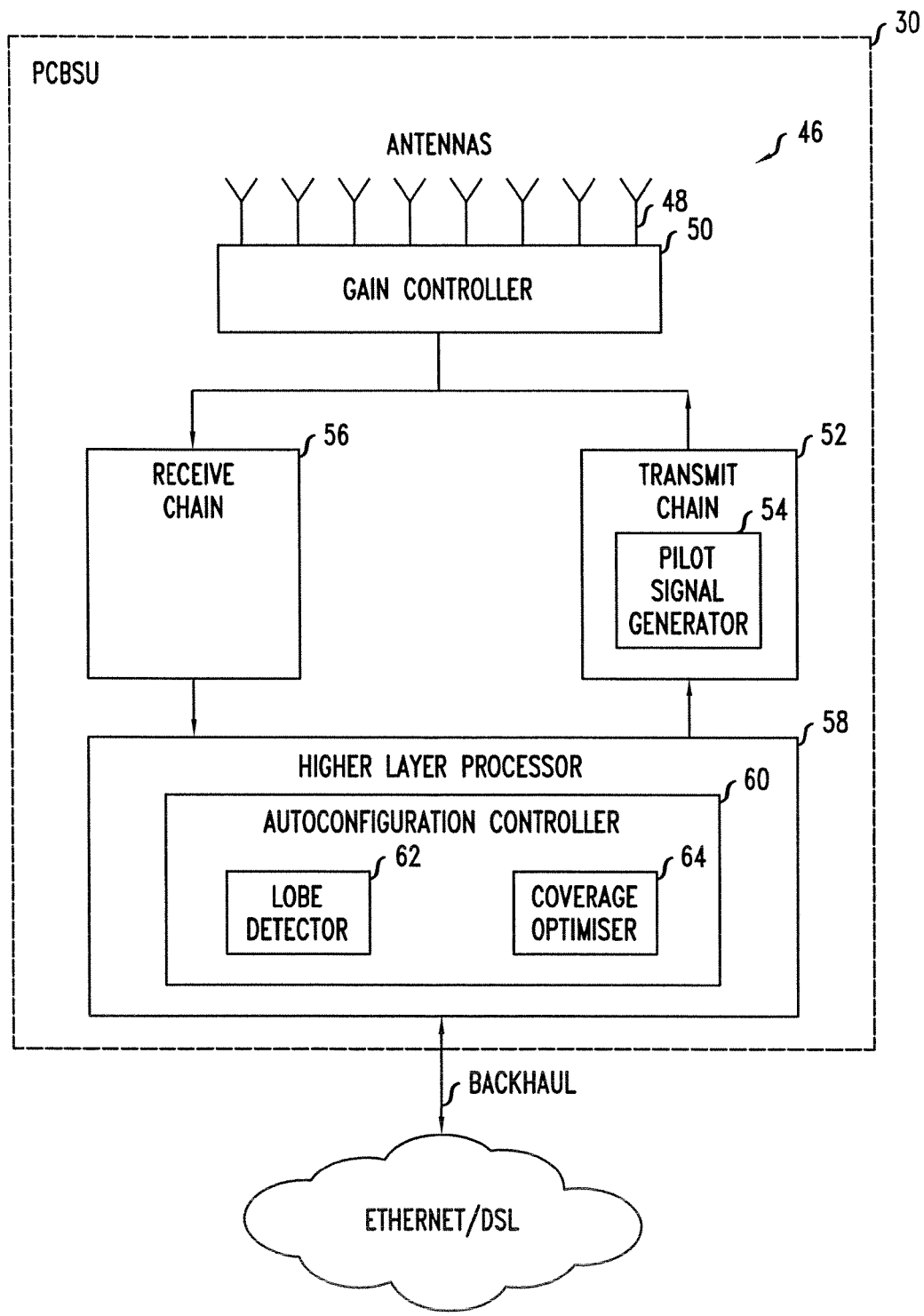
FIG. 4 is a diagram illustrating the picocell base station unit shown in FIG. 3.

As shown in FIG. 4, the picocell base station consists of an array 46 of eight antenna-elements 48 each connected to a gain controller 50. The gain controller 50 enables the gain that is applied to signals to/from each antenna to be adjusted. The PCBSU 30 includes a transmit chain 52 that provides signals for transmission to the gain controller 50. The transmit chain 52 includes a pilot signal generator 54 and an encoder (not shown). The PCBSU also includes a receive chain 56 including a radio frequency signal receiver (not shown), a detector (not shown) and a decoder (not shown). The receive chain 56 processes signals received by antennas 48 then passed via the gain controller 50 to the receive chain 56.

Both the transmit chain 52 and receive chain 56 are connected to a higher layer processor 58. The higher layer processor 58 includes an auto-configuration controller 60 that includes both a radio lobe detector 62 and a coverage optimiser 64. The higher layer processor 58 is connected by an Internet Protocol broadband connection ("backhaul") 66, such as an Ethernet or DSL link, to the rest of the telecommunications world.

The operation of the picocell base station unit (PCBSU) will be described below after a description of the user terminal.

User Terminal

Figure 5:
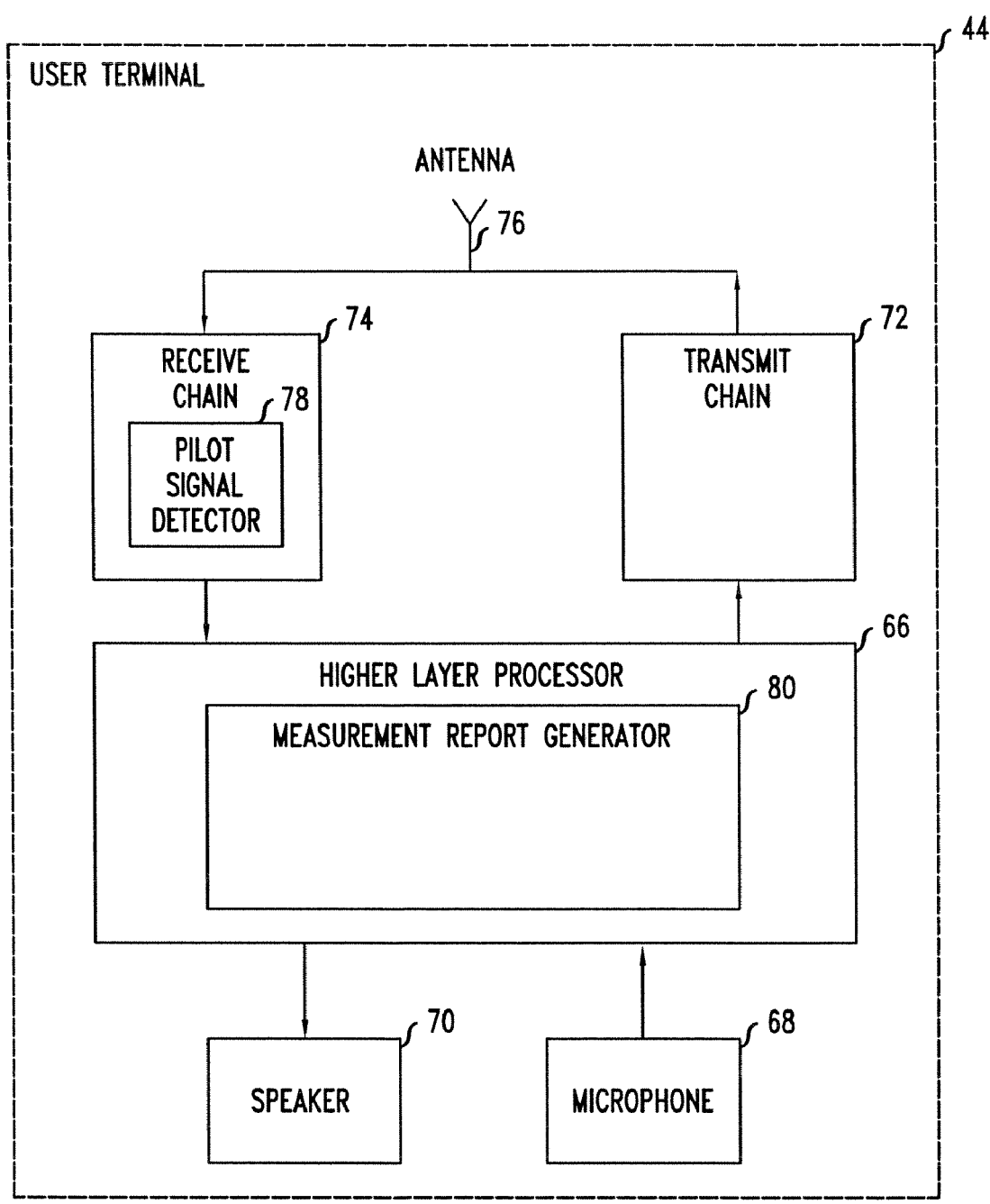
FIG. 5 is a diagram illustrating the user terminal shown in FIGS. 2 and 3.

As shown in FIG. 5, the user terminal 44 includes a higher layer processor 66 connected to a microphone 68 and speaker 70. A transmit chain 72 and receiver chain 74 each connect the higher layer processor 66 to an antenna 76. The receive chain 74 includes a pilot signal detector 78. The higher layer processor 66 includes a measurement report generator 80. The pilot signal detector 78 acts to detect the strength of pilot signals received by the user terminal 44 and the measurement report generator 80 acts to include that information in a measurement report that is passed via the transmit chain 72 to the antenna 76 for transmission to the picocell base station unit.

Improving Coverage

Coverage is improved in essentially a two step approach. Firstly, bearing in mind that each antenna 48 of the array 46 of the picocell base station unit 30 provides a corresponding "lobe" (also known as a beam) of radio coverage, a determination is made of which lobe serves a connected user terminal 44 best. Secondly, after that lobe is identified, the size of that lobe is varied (by adjustment of pilot signal gain) dependent upon the number of unwanted handover attempts occurring. This is explained in more detail below.

Determination of the Best Lobe

The determination of the best lobe to a user terminal in the building is made by a series of gain modifications to the lobes and uses the measurement reporting capability of the user terminal. The user terminal frequently provides feedback to the picocell base station unit 30 of received pilot signal strength. This feedback is in measurement reports.

Measurement reporting by a user terminal is known to the skilled reader in the art, for example being defined in Standards such as Universal Mobile Telecommunications System (UMTS).

Figure 6:
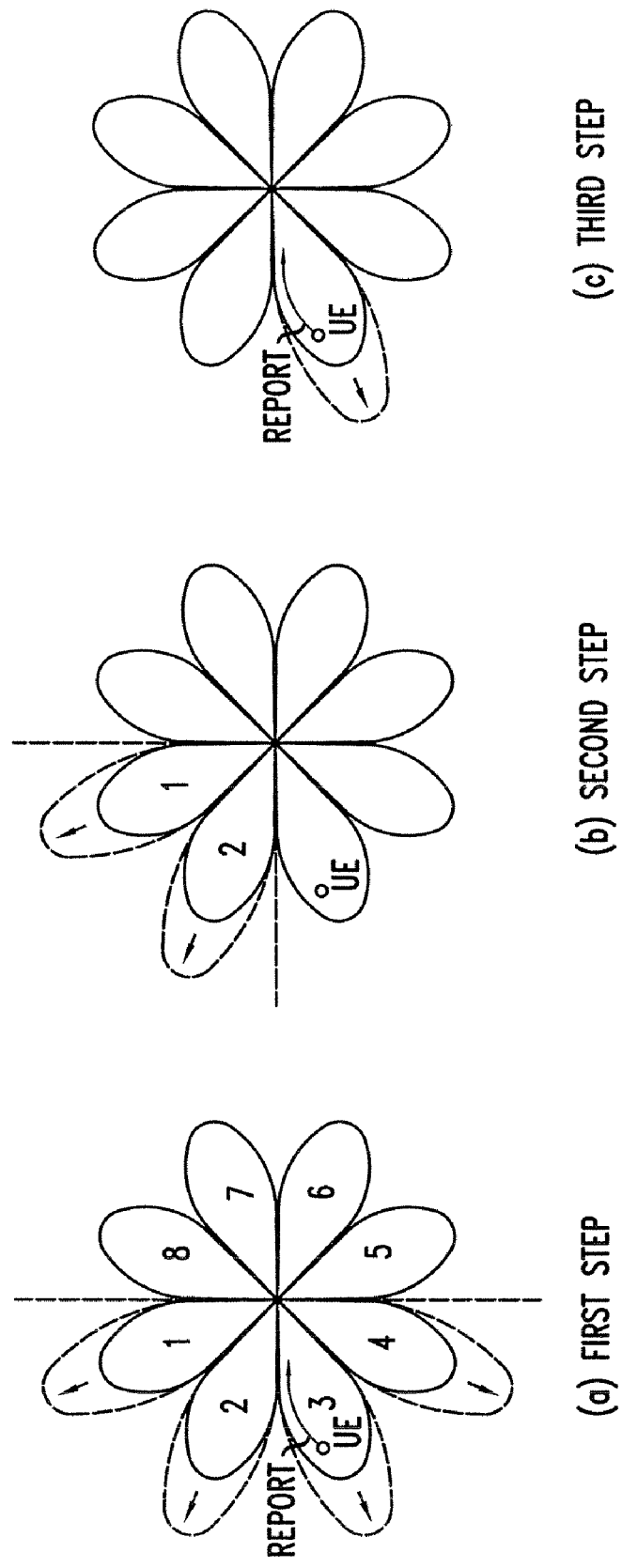
FIG. 6 is a diagram illustrating how pilot signal gains are adjusted over time by the picocell base station shown in FIG. 4.

An example of this lobe determination process is shown in FIG. 6. In the determination, measurement reports from a user terminal indicating either that an increase in received pilot signal gain was detected or no increase in received pilot signal gain was detected, are used by the picocell base station unit 30.

As shown in FIG. 6, as a first step (denoted a in FIG. 6) transmitted pilot signal gain is temporarily increased by a predetermined amount in each of a set of four adjacent lobes 1, 2, 3, 4. In this example, the user terminal (denoted UE in FIG. 6) sends a measurement report indicating that an increase in received pilot signal gain was detected. Accordingly the lobe detector 62 in the picocell base station unit 30 determines that the user terminal is covered by one of these four lobes 1, 2, 3, 4.

As a second step (denoted b in FIG. 6), the picocell base station unit 30 refines the search by temporarily increasing the gain of two of the four lobes 1, 2, 3, 4. In this example, the gain of lobes 1 and 2 are increased. In this example, the user terminal is not covered by those two lobes, so the user terminal reports that no increase in received pilot signal gain was detected. Accordingly the lobe detector 62 in the picocell base station unit 30 determines that the user terminal is covered by one of the other two lobes 3,4.

As a third step (denoted c in FIG. 6), the picocell base station unit 30 refines the search yet further by temporarily increasing the pilot signal gain of one of the remaining two "candidate" lobes 3,4. In this example, this was done for lobe 3, in other words the "correct" lobe was chosen such that the user terminal sends a measurement report indicating that an increase in received pilot signal gain was detected. Accordingly, the lobe detector 62 of the PCBSU 30 has detected the lobe that serves the user terminal in its current location best.

Coverage Optimisation

After the correct lobe serving the user terminal is identified using the above-described process, a coverage improvement process is performed based on the number of mobility events as explained below.

Figure 7:
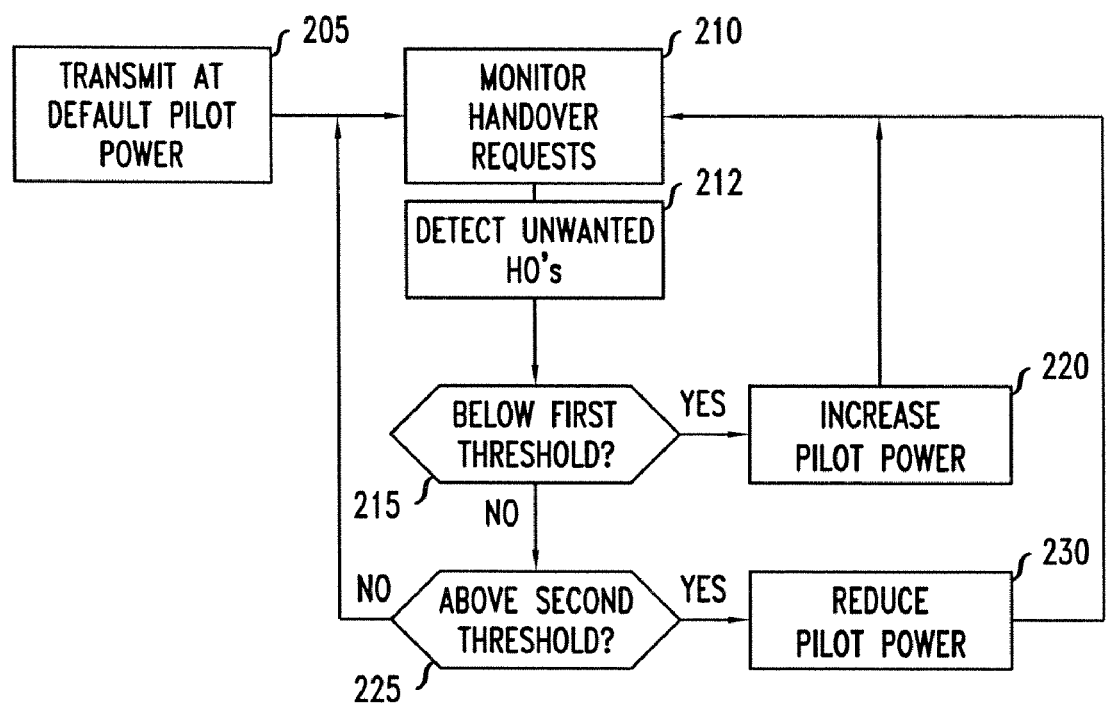
FIG. 7 is a flowchart illustrating how pilot signal gains are controlled by the picocell base station shown in FIG. 4.

FIG. 7 shows, referring back to FIG. 4, how the coverage optimiser 64 of the auto-configuration controller 60 of the PCBSU 30 acts to control the pilot signal gain of the lobe in question generated by the pilot signal generator.

As shown in FIG. 7, for the lobe, when transmitting (step 205) pilot signals using a default pilot signal gain, handover events are monitored (step 210) to detect and determine the rate of unwanted handover events (step 212). The rate of unwanted handover events, in other words, unwanted mobility events, is the number of such events per unit time from mobiles not registered to use the PCBSU or from passing macrocell users who briefly, i.e. within a certain time period, handover to the PCBSU 30 then handback immediately to the macrocell network as they pass by. Registered mobile user terminals can include both "home" user terminals and permitted "visitor" user terminals.

The aim is to maximise indoor coverage for the identified lobe without increasing the number of such unwanted handover events to an unacceptable level.

Accordingly, a determination is made (step 215) whether the number of unwanted events reaches a first threshold of n1 events for a time t1. If No, then pilot signal gain is increased (step 220) by a predetermined increment Delta1 Accordingly the lobe expands in size. The count of unwanted events (steps 210,212) is restarted.

If the first threshold is reached then a determination is made (step 225) whether the number of unwanted events reaches a second threshold of n2 events for a time t2. The second threshold is less stringent than the first threshold. If Yes, then the pilot signal gain is decreased (step 230) by a predetermined decrement Delta2. Accordingly the lobe shrinks in size. If No, the pilot signal gain is not reduced.

The counting of unwanted events (steps 210,212) is then restarted.

Both the measurement times t1,t2 and the gain increment Delta1 and gain decrement Delta2, are adapted over time. This is to improve the speed to reach a stable state having appropriate lobe sizes such that there is good coverage inside the building but little coverage outside. This is also to prevent frequent flipping between increasing and decreasing pilot signal gain. For example, at first t2 is low so that rapid lobe size increase is possible until a first unwanted mobility event is detected, in which case t2 is then increased significantly so as to slow down the rate of increase.

Figure 8:
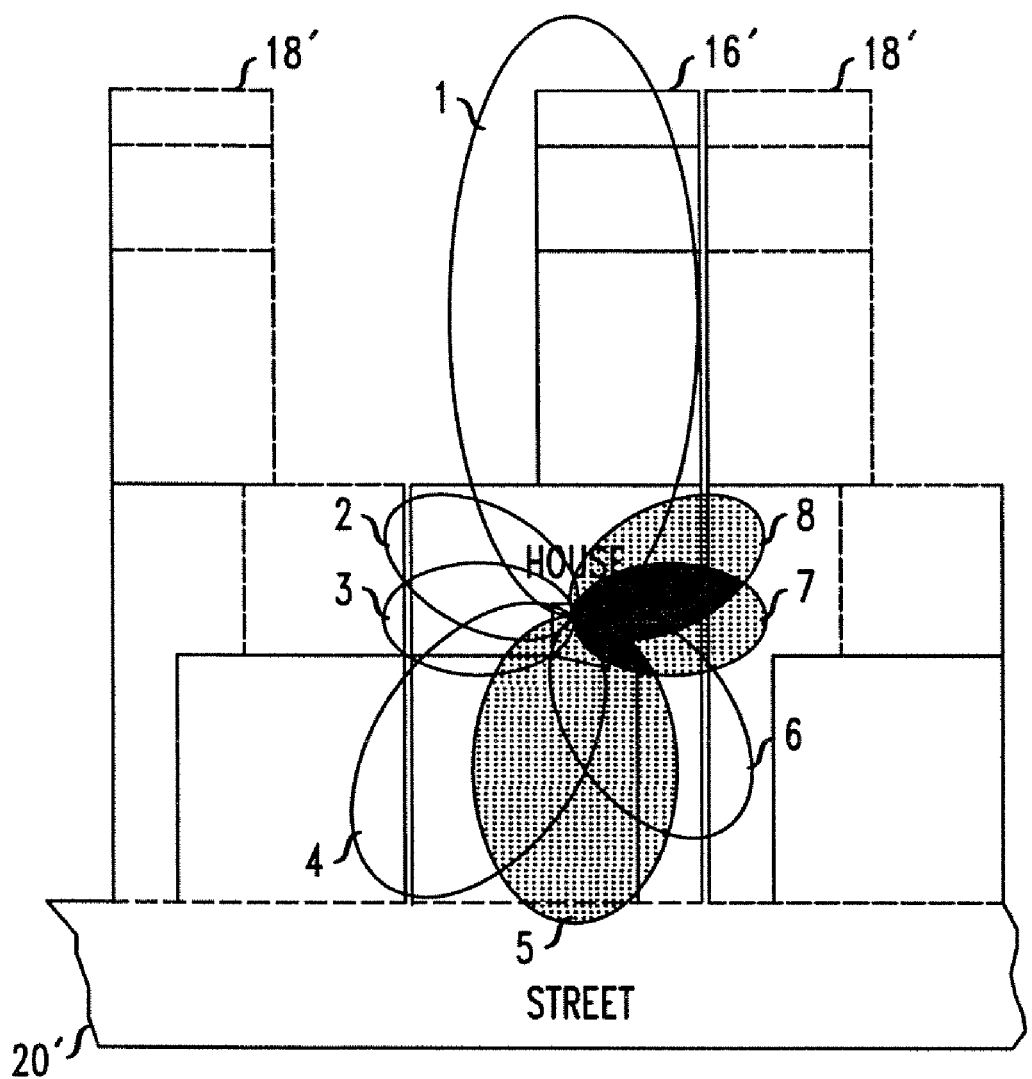
FIG. 8 is a diagram (for comparison with FIG. 1) of optimised coverage by a picocell base station having a multi-element antenna array providing eight beams (wall effects not taken into account)

FIG. 8 shows an example of the resulting coverage, in which various user terminals in various lobes have been identified and so the sizes of the lobes adjusted. It will be seen that the eight lobes 1, 2, 3, 4, 5, 6, 7, 8 (defined by pilot signal gains) have taken various sizes that practically maximise coverage within the building 16' without increasing the number of unwanted handover events to an unacceptable level. Significant radio coverage by the PCBSU in the street 20' and into neighbouring buildings 18' is avoided.

Some Variants

In some otherwise similar examples, predictive testing of lobes and/or enhanced testing can be undertaken as described below.

Predictive "Testing" of Lobes

One option to increase the speed to reach a stable lobe pattern is to use statistics on in which lobe, or lobes, frequent unwanted handovers have happened in the past, in order to select which lobe or lobes to temporarily increase the gain of first, in a test cycle.

For example, if past testing, using the method of determination of best lobe described above, has revealed that 90% of the handovers occur in one particular lobe, this lobe can be tested first, on its own before step (a) shown in FIG. 6 and described above. In most cases the user terminal entering the building will be located within that lobe which has a temporary increase in pilot signal gain so will provide a measurement report indicating a consequential increase in received pilot signal gain. In that case, as the correct lobe covering the user terminal is identified, there is then no need to undertake steps (a), (b) and (c) as described above in relation to FIG. 6.

Enhanced Testing

Within some buildings, signal reflections by walls can contribute to a received signal. This can mean that, in determination of the best lobe, temporarily increasing the pilot signal gain of a lobe in which the user terminal is not located could nevertheless result in the user terminal detecting and so reporting a consequential received pilot signal gain. This can result in unreliable identification of the best lobe for a user terminal in a particular location.

This can be addressed by basing the determination of the best lobe not only on whether an increase in received signal gain is detected.

Figure 9:
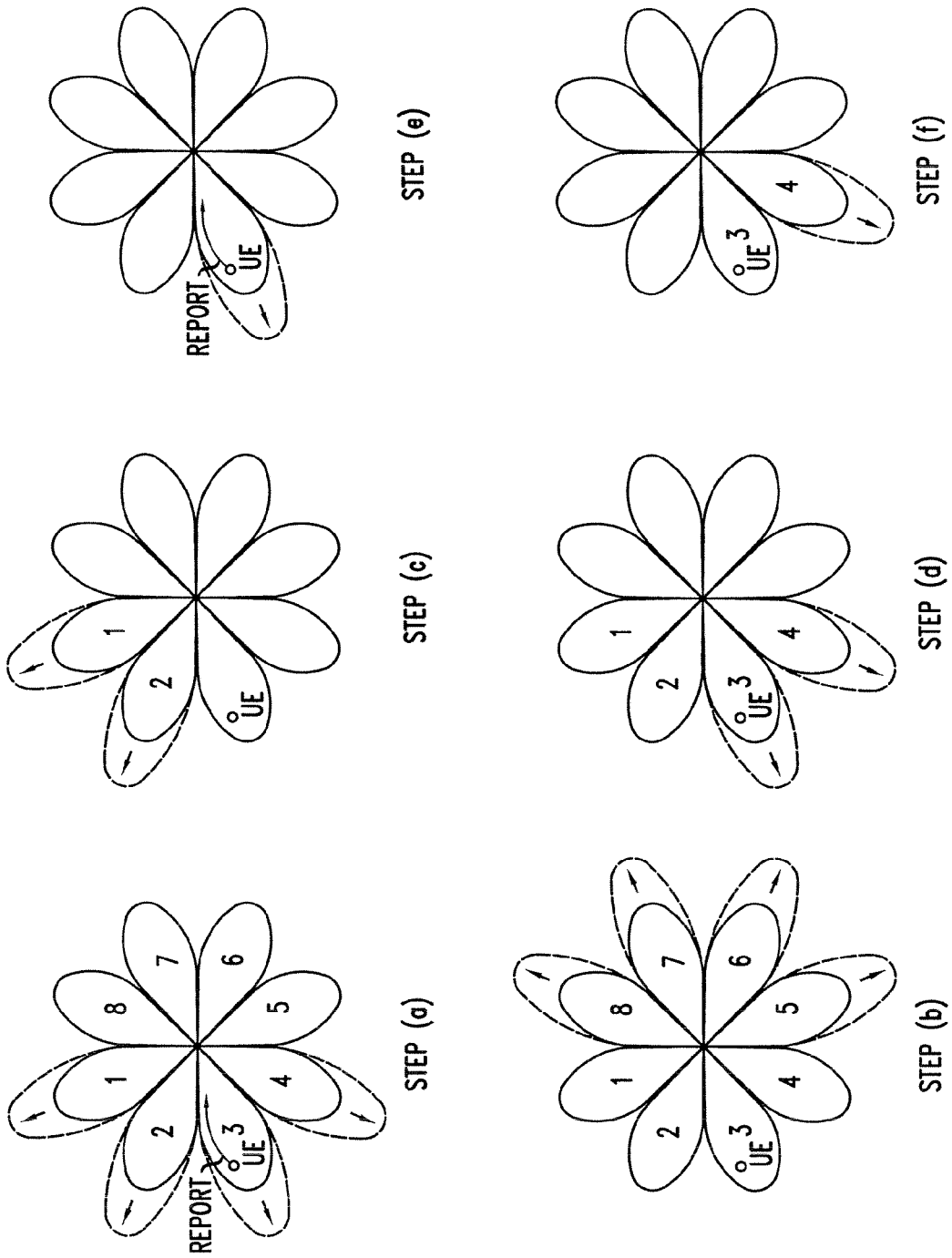
FIG. 9 is a diagram illustrating how pilot signal gains are adjusted over time by the picocell base station according to a further embodiment of the invention.

In this case, as shown in FIG. 9, as a first step (denoted a in FIG. 9) four adjacent lobes are tested first. Specifically, transmitted pilot signal gain is temporarily increased by a predetermined amount in each of a set of four adjacent lobes 1, 2, 3, 4. In this example, the user terminal (denoted UE in FIG. 9) sends a measurement report indicating that an increase in received pilot signal gain was detected. As a second step (denoted b in FIG. 9) the other four lobes are tested. Specifically, transmitted pilot signal gain is temporarily increased by a predetermined amount in each of a set of four adjacent lobes 5, 6, 7, 8, and the user terminal sends a further measurement report. The group of lobes that provides the highest increase in pilot power detected by the user is selected as that within which the user terminal is located, say lobes 1 to 4 in this example.

The picocell base station unit refines the search by further testing the group of lobes (lobes 1, 2, 3, 4 in this example) determined as giving the higher increase of in pilot signal detected. Specifically as a third step (denoted c in FIG. 9), the gain of a sub-group consisting of two lobes, namely lobes 1,2, is temporarily increased; and then as a fourth step (denoted d in FIG. 9) the gain of the other subgroup consisting of two lobes, namely lobes 3,4, are temporarily increased. Again the subgroup that provides the highest increase in pilot signal gain received by the user terminal is selected as the correct one (in this case, lobes 3 and 4).

The picocell base station unit refines the search yet further by testing the lobes in the selected sub-set. Specifically, as a fifth step (denoted e in FIG. 9), by the pilot signal gain is temporarily increased of one of the lobes (lobe 3 in this example) then the other (lobe 4 in this example). The lobe in respect of which the higher increase in pilot signal received by the user terminal is detected is taken to be the lobe in which the user terminal is located, in other words, the lobe that serves the user terminal in its current location best.

It will be understood that although this doubles the number of gain modification steps required, compared to the approach described in relation to FIG. 6 above, it provides more reliable results.

Another Variant

This variant is similar to that described in relation to FIG. 4, basically except that it is received signals from selected lobes that are gain-adjusted rather than signals for transmission in the selected lobes.

Figure 10:
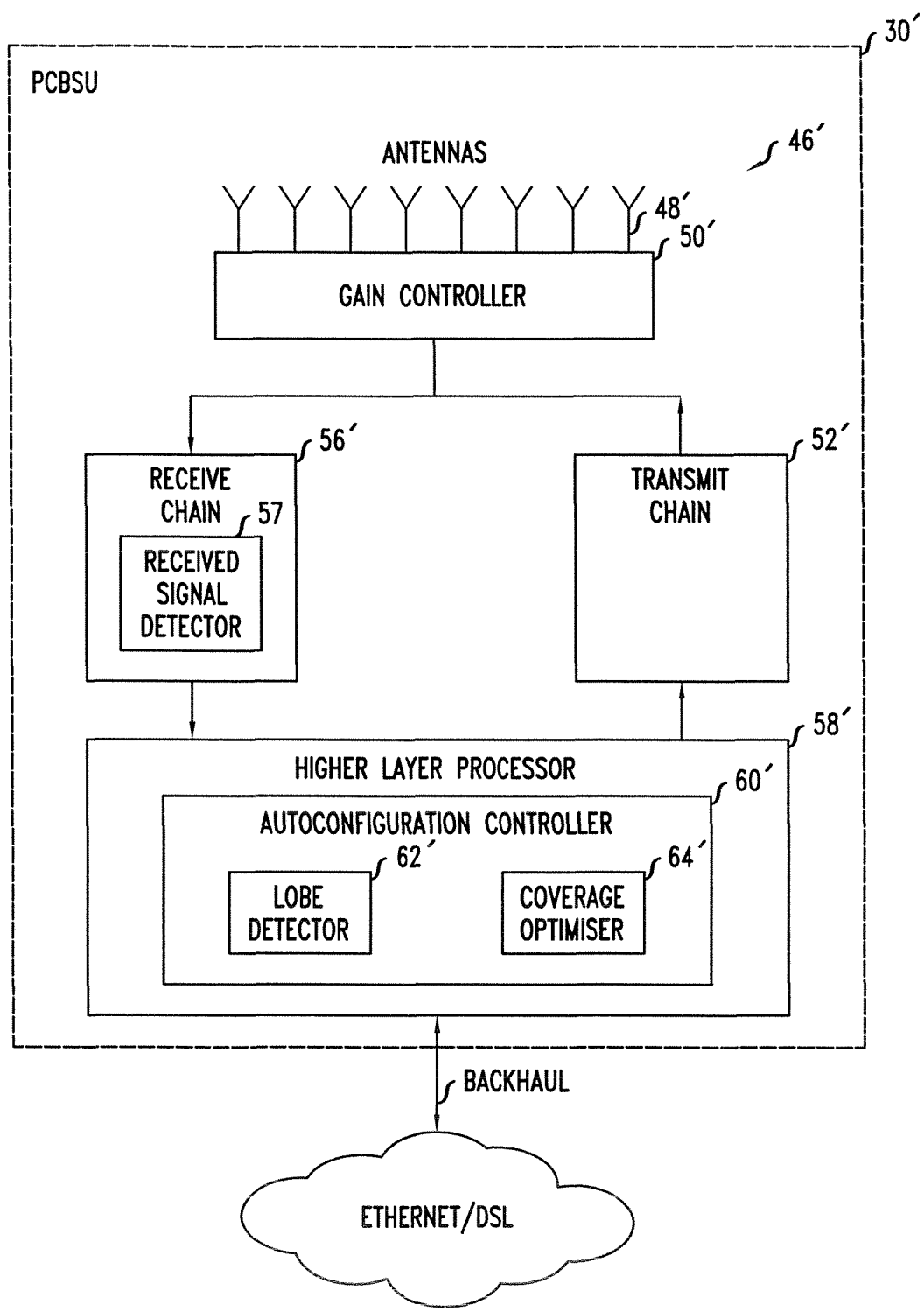
FIG. 10 is a diagram illustrating a further picocell base station according to a further embodiment of the invention.

As shown in FIG. 10, the picocell base station consists of an array 46' of eight antenna-elements 48' each connected to a gain controller 50'. The gain controller 50' enables the gain that is applied to receive signals from each antenna to be adjusted. The PCBSU 30 includes a receive chain 56 including a radio frequency signal receiver (not shown), a receive signal detector 57 and a decoder (not shown). The receive chain 56' processes signals received by antennas 48' then passed via the gain controller 50' to the receive chain 56.

Both the transmit chain 52' and receive chain 56' are connected to a higher layer processor 58. The higher layer processor 58 includes an auto-configuration controller 60' that includes both a radio lobe detector 62 and a coverage optimiser 64. The higher layer processor 58' is connected by an Internet Protocol broadband connection ("backhaul") 66', such as an Ethernet or DSL link, to the rest of the telecommunications world.

The operation of the picocell base station unit (PCBSU) 30' is that the user terminal sends an uplink signal to the base station 30' and receive signals in selected subsets of the lobes are gain-adjusted by the gain controller 50'. The receive signals are processed by the receive chain 56' including detecting the receive signal from selected lobes, in order to, as described previously, determine which subset of the lobes covers the user terminal. Subgroups of selected subsets of lobes are selected and "tested" in an iterative manner as described previously, for example to identify the particular lobe in which the user terminal is located.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The invention claimed is:

1. A method, in a base station for wireless telecommunications having multiple directional antenna elements each providing a corresponding radio coverage lobe, of identifying which subset of the lobes covers a user terminal, wherein the base station is a picocell base station and the method comprising the steps of:
- positioning a user terminal within the coverage area of the base station,
- selecting a subset of the lobes,
- the base station for a period applying an adjusted pilot signal power in respect of the selected subset of the lobes,
- the user terminal detecting received pilot signal power and reporting to the base station information dependent upon the detected signal power,
- the base station determining dependent upon said information whether or not the user terminal is located in the selected subset of lobes, in which further steps are undertaken of:
- selecting a sub-group of the subset of the lobes,
- the base station for a period applying an adjusted pilot signal power in respect of the selected sub-group,
- the user terminal detecting received pilot signal power and reporting to the base station information dependent upon the detected signal power,
- the base station determining dependent upon said information whether or not the user terminal is located in the selected sub-group,
- in which the base station for a period increases pilot signal power in respect of the selected subset of the lobes, then increases signal power for a period in respect of the other subset of the lobes,
- the method including the user terminal detecting received pilot signal power and reporting information to the base station as to which of the subsets provides the greater increase in the detected signal power,
- the base station determining dependent upon said information in which subset of lobes the user terminal is located.

2. A method according to claim 1, in which the user terminal detects and reports increased received pilot power and the base station determines that the user terminal is within the selected subset of lobes in which pilot power was increased.

3. A method according to claim 1, in which said adjusted signal power is provided by a gain adjustment applied at the base station to received signals from the selected subset of lobes.

4. A method according to claim 1, in which the selected subset of the lobes is half of the lobes.

5. A method according to claim 1, in which the further steps are repeated with further sub-group(s) of the sub-group of the subset of lobes being considered until the base station determines the lobe in which the user terminal is located.

6. A method according to claim 1 resulting in determining the lobe in which the user terminal is located, and
- altering the size of said lobe in which the user terminal is located so as to keep the rate of unwanted handover attempts from user terminals in said lobe within predetermined limits,
- in which the unwanted handover attempts from user terminals are from user terminals not registered with the base station.

7. A method according to claim 6, in which if the rate is below a first threshold, signal power is increased in respect of the lobe determined as that in which the user terminal is located, so as to increase size of said lobe.

8. A method according to claim 6, in which if the rate is above a second threshold, pilot signal power is reduced in respect of the lobe determined as that in which the user terminal is located, so as to reduce size of said lobe.

9. A picocell base station for wireless telecommunications, the picocell base station comprising multiple directional antenna elements each providing a corresponding radio coverage lobe, a detector, a controller, and a receiver;
- the detector being operative to identify which subset of the lobes covers a user terminal, in which:
- the detector comprises a selector operative to select a subset of the lobes; wherein:
- the controller is operative to adjust for a period pilot signal power in respect of the selected subset of the lobes;
- the receiver is operative to receive information of pilot signal power received and measured by a user terminal; and
- the detector determines said information dependent upon whether or not the user terminal is located in the selected subset of lobes,
- the selector is further operative to select a sub-group of the subset of the lobes,
- the controller is further operative to adjust for a further period power of further pilot signals in respect of the selected sub-group,
- the receiver is further operative to receive second information dependent upon the pilot signal power received in said further period and measured by the user terminal, and
- the detector is further operative to determine dependent upon said second information whether or not the user terminal is located in the selected sub-group,
- wherein the base station for a period increases pilot signal power in respect of the selected subset of the lobes, then increases signal power for a period in respect of the other subset of the lobes,
- wherein the base station receives from a user terminal information regarding which of the subsets provides the greater increase in the detected signal power,
- wherein the base station determines, dependent upon said information, in which subset of lobes the user terminal is located.

10. A picocell base station according to claim 9, further comprising a pilot signal generator, the signal power being pilot signal power, and the receiver is operative to receive information of pilot signal power measured and reported by the user terminal.

11. A picocell base station according to claim 9, in which the controller is operative to adjust for a period signal power by adjusting received signal gain, signal power received from a user terminal being measured at the base station to provide the information.

12. A picocell base station according to claim 9, in which the selected subset of the lobes is half of the lobes.

13. A picocell base station according to claim 9, wherein the base station determines the lobe in which the user terminal is located by iteratively considering subgroup(s) of the sub-group of the subset of lobes.

14. A picocell base station according to claim 9, wherein the base station determines the lobe in which the user terminal is located, and
- alters the size of said lobe in which the user terminal is located so as to keep the rate of unwanted handover attempts from user terminals in said lobe within predetermined limits,
- wherein the unwanted handover attempts from user terminals are from user terminals not registered with the base station.

15. A picocell base station according to claim 14, in which if the rate is below a first threshold, signal power is increased in respect of the lobe determined as that in which the user terminal is located, so as to increase size of said lobe.

16. A picocell base station according to claim 15, in which if the rate is above a second threshold, pilot signal power is reduced in respect of the lobe determined as that in which the user terminal is located, so as to reduce size of said lobe.

* * * * *